(12) United States Patent
Brizzolara et al.

(10) Patent No.: US 10,407,529 B2
(45) Date of Patent: *Sep. 10, 2019

(54) TRANSPARENT ARTICLE MADE OF PVC GRAFT COPOLYMERS

(71) Applicant: VESTOLIT GmbH & Co. KG, Marl (DE)

(72) Inventors: Davide Brizzolara, Herten (DE); Ingo Fischer, Marl (DE); Jan-Stephan Gehrke, Haltern am See (DE); Dieter Polte, Schermbeck (DE); Axel Stieneker, Münster (DE); Harald Sturm, Dorsten (DE)

(73) Assignee: VESTOLIT GmbH & Co. KG, Marl (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,309

(22) Filed: May 30, 2018

(65) Prior Publication Data

US 2018/0273666 A1 Sep. 27, 2018

Related U.S. Application Data

(63) Continuation of application No. 14/767,257, filed as application No. PCT/EP2013/052656 on Feb. 11, 2013.

(51) Int. Cl.
*C08F 265/04* (2006.01)
*C08L 51/00* (2006.01)
*C08F 2/26* (2006.01)

(52) U.S. Cl.
CPC ............. *C08F 265/04* (2013.01); *C08F 2/26* (2013.01); *C08L 51/003* (2013.01); *C08L 2203/16* (2013.01); *C08L 2205/025* (2013.01)

(58) Field of Classification Search
CPC ............. C08J 2351/00; C08L 2207/53; C08L 2205/00; C08F 214/06
See application file for complete search history.

(56) References Cited

U.S. PATENT DOCUMENTS

| | | | |
|---|---|---|---|
| 5,614,049 A | 3/1997 | Kohlhammer et al. | |
| 6,583,221 B1 | 6/2003 | Omura et al. | |
| 9,957,385 B2 | 5/2018 | Brizzolara et al. | |
| 2002/0142158 A1 | 10/2002 | Ono et al. | |
| 2005/0113540 A1 | 5/2005 | Weaver et al. | |
| 2007/0149713 A1 | 6/2007 | Kuwahata et al. | |
| 2016/0075811 A1 | 3/2016 | Brizzolara et al. | |
| 2016/0075812 A1 | 3/2016 | Brizzolara et al. | |
| 2016/0075870 A1 | 3/2016 | Brizzolara et al. | |

FOREIGN PATENT DOCUMENTS

| | | |
|---|---|---|
| CA | 2900843 A1 | 8/2014 |
| CA | 2907442 A1 | 8/2014 |
| CA | 2907479 A1 | 8/2014 |
| CN | 105229037 A | 1/2016 |
| CN | 105246921 A | 1/2016 |
| CN | 105246969 A | 1/2016 |
| DE | 2123384 A1 | 11/1972 |
| DE | 3544235 A1 | 6/1987 |
| DE | 3803036 A1 | 8/1989 |
| DE | 4338374 A1 | 5/1995 |
| DE | 10121580 A1 | 11/2002 |
| EP | 0313507 A2 | 4/1989 |
| EP | 0472852 B1 | 3/1992 |
| EP | 0590659 A1 | 4/1994 |
| EP | 0647663 B1 | 4/1995 |
| EP | 2067795 A1 | 6/2009 |
| EP | 2953980 A1 | 12/2015 |
| EP | 2953981 A1 | 12/2015 |
| EP | 2954007 A1 | 12/2015 |
| GB | 1530854 A | 11/1978 |
| JP | 2003253082 A | 9/2003 |
| JP | 2016507621 A | 3/2016 |
| JP | 2016510074 A | 4/2016 |
| RU | 2021292 C1 | 10/1994 |
| RU | 2274647 C2 | 4/2006 |
| SU | 481160 A3 | 8/1975 |
| WO | 2014121850 A1 | 8/2014 |
| WO | 2014121851 A1 | 8/2014 |
| WO | 2014121852 A1 | 8/2014 |

OTHER PUBLICATIONS

Domininghaus-Kunststoffe, 7th revised and extended edition, 2008, chapter 2.1.2.2.1 Erhohung der Schlagzahigkeit, Polyacrylate als Modifizierungsmittel fur transparente PVC-Artikel, p. 372 (with English translation of p. 372).

F.P. Reding et al., Glass transition and melting point of poly(vinyl chloride), Journal of Polymer Science, Vo . . . 56, No. 163, Jan. 1, 1962, pp. 225-231.

International Preliminary Report on Patentability issued in PCT/EP2013/052655, completed Jul. 2, 2015, 23 pages.

International Preliminary Report on Patentability issued in PCT/EP2013/052656, completed on Jul. 20, 2015, 14 pages.

International Preliminary Report on Patentability issued in PCT/EP2013/052657, completed on Apr. 20, 2015, 10 pages.

International Search Report issued in PCT/EP2013/052655, dated Oct. 18, 2013, 5 pages.

International Search Report issued in PCT/EP2013/052656, dated Oct. 18, 2013, 4 pages.

International Search Report issued in PCT/EP2013/052657, dated Oct. 25, 2013, 4 pages.

(Continued)

*Primary Examiner* — Mark S Kaucher
(74) *Attorney, Agent, or Firm* — Faegre Baker Daniels LLP

(57) ABSTRACT

The invention relates to a method for producing vinyl chloride graft copolymers by emulsion polymerization and to a method for producing mixtures of said graft copolymers. The invention also relates to transparent articles produced using the claimed graft copolymers or mixtures thereof.

16 Claims, No Drawings

(56) References Cited

OTHER PUBLICATIONS

Pan, Mingwang, et al. "Synthesis and Characterization of Poly(butyl acrylate-co-ethylhexyl acrylate)/Poly(vinyl chloride)[P(BA-EHA)/PVC] Novel Core-Shell Modifier and Its Impact Modification for a Poly(vinyl chloride)-Based Blend." Polymer Engineering and Science, 50(6):1085-1094, 2010.

Wilkes et al., PVC-Handbook, 1st Edition, Chapter 1, p. 14, Hanser Gardner Publications (2005).

TRANSPARENT ARTICLE MADE OF PVC GRAFT COPOLYMERS

CROSS-REFERENCE TO RELATED APPLICATION

This application is a Continuation of U.S. application Ser. No. 14/767,257, filed Nov. 30, 2015, which is a 371 application of International Application No. PCT/EP2013/052656, filed Feb. 11, 2013, both of which are herein incorporated by reference in their entireties.

The invention relates to a method for preparing vinyl chloride graft copolymers by emulsion polymerization, and to a method for producing blends of such graft copolymers. The invention also relates to transparent moldings (i.e. molded articles) manufactured by using the graft copolymers and their blends, respectively, according to the invention.

Plasticized polyvinyl chloride (PVC) does not belong to the group of thermoplastic elastomers (TPE) although it has TPE properties (PVC Handbook, Charles E. Wilkes, James W. Summers, Charles Anthony Daniels—2005, page 14). Due to the low costs for the raw materials, the multifaceted processing properties and the good product features it takes a special position among the thermoplastic elastomers. Plasticized PVC shows very good stretchability and tensile strength due to the formation of microcrystallites and the dipole-dipole interactions between chlorine and hydrogen atoms. By varying the percentage of plasticizer in PVC the rigidity and flexibility of a product can be adjusted in a very easy manner. This has major logistic advantages for the fabricator, since he can produce a plurality of products from only a few ingredients. Only the migration ability of the low-molecular weight plasticizer has to be considered a disadvantage. Due to migration of the plasticizer the material embrittles, which leads to a degradation of the mechanical properties.

For many years, various oligomeric and polymeric plasticizers have been employed, which, due to their high molecular weights, show only little to none tendency to migrate (Domininghaus—Kunststoffe, 7$^{th}$ revised and extended edition 2008). Known examples are copolymers consisting of ethylene-vinyl acetate-vinyl chloride (EVA-VC), ethylene-vinyl acetate (EVA, Levapren®), acrylonitrile-butadiene (NBR), styrene-butadiene (SBR), ethylene-vinyl acetate-carbon monoxide (Elvaloy®), styrene-butadiene-styrene (SBS, Kraton®) etc. The high-molecular weight plasticizers are blended with PVC or grafted with PVC in a suspension polymerization process. These products are only used for special requirements (low-temperature flexibility, low migration, fat resistance, etc.), since otherwise the disadvantages will prevail, such as low plasticizing, more complex processing, inferior tear resistance, etc. To be considered a particularly serious drawback is the fact that moldings which were produced from a blend of PVC and the majority of polymeric plasticizers (elastomers) are opaque.

The PBA-g-PVC graft copolymers described in the prior art and prepared in emulsion or suspension processes can only be processed into translucent or opaque moldings.

Cross-linked polyacrylic esters (PAE) can be employed to improve the notch impact strength of rigid PVC (EP 0472852). In DE 3803036 a suspension process is described which allows to obtain a PVC that contains 65 wt % of a cross-linked PAE. This product can be employed as an impact resistance modifier or as a polymeric plasticizer for PVC.

In EP 0647663 a method is described for producing thermoplastically elastomeric graft copolymerizates of PVC having cross-linked polyacrylates as a graft base or as a graft substrate.

In the prior art the only method known to us for producing transparent polyacrylic ester-modified PVC articles using methods such as extrusion, injection molding or calendering, the usage of graft copolymers is described which contain a certain percentage of polystyrene within the polyacrylate phase. Due to its higher refractive index ($n_D^{20}$=1.60), the content of polystyrene counterbalances the difference in the refractive indices of polybutyl acrylate and PVC (Domininghaus—Kunststoffe, 7$^{th}$ revised and extended edition 2008, chapter 2.1.2.2.1 Erhöhung der Schlagzähigkeit—Polyacrylate als Modifizierungsmittel für transparente PVC-Artikel, page 372). Due to the high glass transition temperature of polystyrene, this principle is only suitable for rigid PVC since the content of polystyrene outweighs the plasticizing effect of polyacrylates. Moreover, the UV and weathering resistance of the PVC articles is impaired owing to the content of polystyrene.

Thus, it is an object of the invention to provide materials without adding external plasticizers (in various degrees of hardness Shore A 70 to Shore D 80, if necessary), based on vinyl chloride, which can be processed into transparent films and molded articles.

An object of the present invention is a method for producing a vinyl chloride graft copolymer by using emulsion polymerization, wherein the graft copolymer contains a graft base and a grafted copolymer phase, which at least partially consists of vinyl chloride, comprising the steps of:

a) Preparing a graft base by polymerizing monomers, wherein the glass transition temperature $T_g$ of the graft base is adjusted by appropriately selecting the monomers to be used, and b) Grafting a copolymer phase onto the graft base prepared in a) by using emulsion polymerization, thus obtaining a vinyl chloride graft copolymer latex, wherein by appropriately selecting the monomers to be used and the optionally used comonomers, the glass transition temperature $T_g$ of the grafted copolymer phase is adjusted in such a way that the glass transition temperature $T_g$ of the graft base is lower than the glass transition temperature $T_g$ of the grafted copolymer phase, and c) Separating the vinyl chloride graft copolymer as a solid from the vinyl chloride graft copolymer latex, characterized in that by appropriately selecting the polymerization conditions in step b) the average particle size of the vinyl chloride graft copolymer is adjusted to less than 300 nm, preferably less than 200 nm, particularly preferably less than 150 nm and most preferably less than 100 nm.

In a systematic study it has been found that the particle size of the graft copolymer prepared in an emulsion process has a great influence on the transparency of molded articles produced therefrom. By reducing the diameter of the particles to below certain values the transparency of a press plate manufactured therefrom will be highly improved. This also applies to vinyl chloride graft copolymers having a cross-linked graft base and a non-cross-linked graft shell or having both a cross-linked graft base and a cross-linked graft shell.

The glass transition temperature $T_g$ of the grafted copolymer phase typically lies in the range of above 20 to 120° C. and/or the one of the graft base in the range of −80 to 20° C. In a preferred embodiment of the invention the glass transition temperature $T_g$ of the grafted copolymer phase lies between 40 and 90° C., and the one of the graft base between −60 and −20° C. The $T_g$'s of the grafted copolymer phase and of the graft base result from the composition of the respectively used monomers.

The vinyl chloride graft copolymers are prepared in an emulsion process. In doing so, the graft base can be prepared by copolymerizing vinyl compounds. The grafted compound can be prepared from 60 to 100 wt % of vinyl chloride, preferably 80 to 100 wt %, and from 0 to 40 wt % of other polymerizable vinyl compounds, preferably 0 to 20 wt %.

In another preferred embodiment the graft base and/or the grafted copolymer phase are cross-linked.

The emulsion polymerization is preferably carried out semi-continuously. In the preparation process of the graft base, water, initiators, monomers, emulsifiers and other additives can be pre-charged into a reactor and partly added in small amounts. In a preferred embodiment, water and the total amount of emulsifier are pre-charged and both the monomers and the initiators are added. The feeding speed of the additives is based upon the conversion speed. The duration of the polymerization is adjusted to one to three hours by the amount of the initiator employed. After the polymerization has ended, the graft base is processed and pre-charged for the preparation of the graft copolymer. Vinyl chloride and, if applicable, other polymerizable vinyl compounds, are added within 10 min to 180 min. In a preferred embodiment, the amount of VC is divided into a portion to be pre-charged and a portion to be added. In the process, 5 to 20 parts of VC are pre-charged (at once), then polymerized until the pressure drops, and then the addition of the residual amount of VC is started. The temperature is regulated to adjust the desired K-value. To speed up the polymerization, an initiator is added simultaneously. An emulsifier can be added to increase the stability of the dispersion. The content of solids in the fully polymerized dispersion lies between 20 and 60 wt %, and preferably between 30 and 55 wt %.

Suitable vinyl compounds for the graft base are, for example, acrylic acid esters or methacrylic acid esters (in brief: (meth)acrylic acid ester). Also, butadiene, 2-chlorobutadiene, 1-butene, isoprene, vinylidene chloride, vinyl acetate, vinyl alkyl ether, etc. can be used as vinyl compound.

For the grafting, preferably merely vinyl chloride is used. But it is also possible to homo- or copolymerize (meth) acrylic acid esters, which contain 1 to 12 carbon atoms in the alkyl chain of the esterified linear, branched or cyclic alcohol, such as methyl acrylate, ethyl acrylate, propyl acrylate, butyl acrylate, t-butyl acrylate, pentyl acrylate, isopentyl acrylate, cyclohexyl acrylate, ethylhexyl acrylate, methyl methacrylate, ethyl methacrylate, propyl methacrylate, butyl methacrylate, t-butyl methacrylate, pentyl methacrylate, isopentyl methacrylate, ethylhexyl methacrylate, cyclohexyl methacrylate, etc.

In step b) of the method according to the invention the copolymer phase is typically grafted by emulsion polymerization using at least one emulsifier, in which preferably 60 to 100 wt % of the emulsifier amount is pre-charged, based on the total amount of emulsifier.

The polymerization temperature in the process of preparing each of the graft bases typically lies between 20 and 90° C., preferably between 60 and 95° C.

The polymerization temperature in the process of preparing each of the grafted copolymer phases typically lies between 45 and 90° C., preferably between 55 and 70° C.

The percentage of the graft base is preferably 5 to 70 wt %, and the percentage of the grafted copolymer phase is preferably 30 to 95 wt %, in each case based on the vinyl chloride copolymer.

Suitable ionic emulsifiers are alkyl sulfonates, aryl sulfonates, alkyl sulfates, alkyl ether sulfates, fatty acid salts, diaryl sulfonates, etc. It is also possible to use non-ionic emulsifiers, such as alkyl ether alcohols having 2 to 20 carbon atoms in the alkyl chain and 1 to 20 ethylene glycol units, fatty alcohols, etc., alone or in combination with ionic emulsifiers. The total amount of emulsifier used lies between 0.1 to 5 wt %, based on the amount of monomers employed.

Suitable initiators are water-soluble peroxides, which form radicals by thermal decomposition alone or which can be caused to decompose in combination with a reducing agent and, if necessary, a catalyst. The amount of the initiators employed usually lies between 0.01 and 0.5 wt %, based on the monomers employed.

In a preferred embodiment of the invention the graft base is cross-linked by copolymerization with one or more different monomers that contain two or more non-conjugated ethylenically unsaturated double bonds. Optionally, it is possible to additionally cross-link the grafted copolymer phase by copolymerization with one or more different monomers that contain two or more non-conjugated ethylenically unsaturated double bonds.

In another preferred embodiment of the invention, a) both the graft base and the graft shell will not be cross-linked, or b) the graft base will not be cross-linked and the graft shell will be cross-linked.

Suitable compounds for cross-linking are diallyl phthalate, allyl methacrylate, allyl acrylate, ethylene glycol dimethacrylate, propylene glycol dimethacrylate, butylene glycol diacrylate, trimethylene glycol diacrylate, glycidyl methacrylate, glycidyl acrylate, etc.

In the method according to the invention, a vinyl chloride graft copolymer-containing latex is obtained by way of emulsion polymerization. The solid will be separated either by adding an electrolyte, coagulation and mechanical separation methods such as filtration, decantation, centrifugation of the latex, followed by drying, or by spray drying.

In a particular embodiment of the invention at least two different vinyl chloride graft copolymers are prepared independently of each other and mixed subsequently, giving a blend in which the at least two different graft copolymers differ from each other by their respective percentage weight distribution of the graft base and the grafted copolymer phase.

In a particular embodiment of the invention the steps a), b), and c) and the blending are carried out in such a way that the blend contains:
A) one or more graft copolymers A, each containing 41 to 70 wt % of graft base and 30 to 59 wt % of grafted copolymer phase, and/or
B) one or more graft copolymers B, each containing 26 to 40 wt % of graft base and 60 to 74 wt % of grafted copolymer phase, and/or
C) one or more graft copolymers C, each containing 5 to 25 wt % of graft base and 75 to 95 wt % of grafted copolymer phase,
wherein the blend contains at least two different graft copolymers that are covered by A) and B), by B) and C), by A) and C), or at least three different graft copolymers that are covered by A), B) and C).

In a further preferred embodiment of the invention the steps a), b) and c) and the blending are carried out in such a way that a blend is obtained consisting of:

A) one or more graft copolymers A in an amount of 1 to 99 wt %, based on the blend, each graft copolymer A containing 30 to 59 wt % of a grafted copolymer phase, at least partially prepared from vinyl chloride, having a glass transition temperature $T_g$ in the range of above 20 to 120° C., and 41 to 70 wt % of a graft base having a glass transition temperature $T_g$ in the range of −80 to 20° C., and/or B) one or more graft copolymers B in an amount of 1 to 99 wt %, based on the blend, each graft copolymer B containing 60 to 74 wt % of a grafted copolymer phase, at least partially prepared of vinyl chloride, having a glass transition temperature $T_g$ in the range of above 20 to 120° C., and 26 to 40 wt % of a graft base having a glass transition temperature $T_g$ the range of −80 to 20° C., and/or C) one or more graft copolymers C in an amount of 1 to 99 wt %, based on the blend, each graft copolymer C containing 75 to 95 wt % of a grafted copolymer phase, at least partially prepared from vinyl chloride, having a glass transition temperature $T_g$ in the range of above 20 to 120° C., and 5 to 25 wt % of a graft base having a glass transition temperature $T_g$ in the range of −80 to 20° C., and/or D) further ingredients in an amount of 0 to 75 wt %, based on the blend, wherein the blend contains at least 25 wt % of graft copolymers that together meet at least two of the conditions A), B) and C), and the total percentage of the ingredients covered by A), B), C) and D) adds to 100%.

Also an object of the invention is a vinyl chloride graft copolymer prepared according to the method described above.

A further object of the invention is a blend that contains different vinyl chloride graft copolymers prepared according to the method described above.

Also an object of the invention is an article prepared by using a vinyl chloride graft copolymer prepared according to the method described above or by using a blend that contains different vinyl chloride graft copolymers prepared according to the method described above.

Preferred articles according to the invention have a transmittance of at least 65%, preferably of at least 75%, and particularly preferred of at least 85%, and/or a haze value of at most 60, preferably of at most 50, and particularly preferred of at most 40.

Also an object of the invention is the use of a vinyl chloride graft copolymer and the use of the blends described above for manufacturing an article, preferably for manufacturing films by way of extrusion and/or calendering or for manufacturing molded articles by way of extrusion or injection molding or other thermoplastic molding methods.

In the following examples the method according to the invention for preparing graft copolymers of vinyl chloride, having a high transparency, is described.

EXAMPLES

Example 1

Graft Base

Into a 10-liter reactor with stirrer, 4156 g of deionized water, 0.4 g of allyl methacrylate, 78 g of butyl acrylate, 705.9 g of potassium myristate (concentration: 5 wt %), and 0.720 g of potassium peroxodisulfate were pre-charged and heated to 80° C. After the reaction had started, adding of 784.3 g of a 0.3% aqueous solution of potassium peroxodisulfate was carried out within 180 min. Simultaneously, 11.36 g of allyl methacrylate and 2263 g of butyl acrylate were added within 180 min. After the addition had ended the reaction temperature was maintained for 60 min and the preparation was cooled down subsequently.

7911 g of the dispersion were obtained. The solid content was 29.8%, the surface tension was 52.2 mN/m and the pH was 7.6. The average volume-based particle size (PSV) was 12 nm.

Graft Copolymer

Into a 10-liter autoclave with a water-cooled double jacket and a paddle agitator, 1367 g of water, 332 g of a 5% solution of potassium myristate, 3087 g of graft base, 4.32 g of diallyl phthalate and 1076 g of vinyl chloride were pre-charged and heated to 68° C. When the polymerization temperature was reached, adding of potassium peroxodisulfate and ascorbic acid was started. The adding speed was adjusted in such a way that the difference between the interior temperature and the supply temperature of the jacket cooling was about 10° C. After the pressure had dropped by 4 bars, the preparation was set to cool and depressurized. The dispersion was discharged. The solid content of the dispersion was 30.7 wt %, the surface tension was 56.7 mN/m, the pH was 7.7. The average volume-based particle size was 61 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 46.9 wt % by an oxygen analysis.

Example 2

Graft Base

The graft base of Example 1 was used.

Graft Copolymer

Into a 10-liter autoclave with a water-cooled double jacket and a paddle agitator 2365 g of water, 387.3 g of a 5% solution of potassium myristate, 2506 g of graft base, 6.347 g of diallyl phthalate and 1580 g of vinyl chloride were pre-charged and heated to 68° C. When the polymerization temperature was reached, adding of potassium peroxodisulfate and ascorbic acid was started. The adding speed was adjusted in such a way that the difference between the interior temperature and the supply temperature of the jacket cooling was about 10° C. After the pressure had dropped by 4 bars, the preparation was set to cool and depressurized. The dispersion was discharged. The solid content of the dispersion was 30.5 wt %, the surface tension was 58.5 mN/m, the pH was 8.0. The average volume-based particle size was 58 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 33 wt % by an oxygen analysis.

Example 3

Graft Base

The preparation of Example 1 was repeated. 7909 g of an aqueous dispersion were discharged. The solid content of the dispersion was 30 wt %, the surface tension was 54.4 mN/m, the pH was 7.4. The average volume-based particle size was 12 nm.

Graft Copolymer 3144 g of water, 387.3 g of a 5% solution of potassium myristate, 1400 g of graft base, 1906 g of vinyl chloride and 7.63 g of diallyl phthalate were pre-charged and polymerized following Example 1. The dispersion was discharged. The solid content of the dispersion was 29.6 wt %, the surface tension was 51.9 mN/m, the pH was 8.1. The average volume-based particle size was 56 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 19.2 wt % by an oxygen analysis.

Example 4

Graft Base

Into a 10-liter reactor with stirrer, 2642 g of deionized water, 0.80 g of diallyl phthalate, 77 g of butyl acrylate, 315.3 g of potassium myristate (concentration: 1.85 wt %) and 0.714 g of potassium peroxodisulfate were pre-charged and heated to 80° C. After the reaction had started, adding of 1167 g of a 0.1% aqueous solution of ammonium peroxodisulfate was carried out within 180 min. Simultaneously, 22.55 g of diallyl phthalate, 2233 g of butyl acrylate and 1009 g of a 1.85% potassium myristate solution were added within 180 min. After the addition had ended, the interior reactor temperature was maintained for 60 min and the preparation was cooled down subsequently. 7335 g of the dispersion were obtained. The solid content was 30.9%, the surface tension was 54.4 mN/m and the pH was 8.3.

Graft Copolymer 2144 g of water, 280 g of 5% potassium myristate solution and 3021 g of graft base were pre-charged and heated to 68° C. Then, 117 g of vinyl chloride were added and further 1278 g of vinyl chloride were added within 100 min. For the activation, a hydrogen peroxide solution and an ascorbic acid solution were used. The adding speed was adjusted in such a way that the difference between the interior temperature and the supply temperature of the jacket cooling was about 10° C. After the pressure had dropped by 4 bars, the preparation was set to cool and depressurized. The solid content of the dispersion was 28.8 wt %, the surface tension was 54.9 mN/m, the pH was 7.5. The average volume-based particle size was 92 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 41.1 wt % by an oxygen analysis.

Example 5

Graft Base

Into a 10-liter reactor with stirrer, 1784 g of deionized water, 68.25 g of butyl acrylate, 0.35 g of allyl methacrylate, 411.8 g of potassium myristate (concentration: 1 wt %), and 0.63 g of potassium peroxodisulfate were pre-charged and heated to 80° C. After the reaction had started, adding of 686 g of a 0.3% aqueous solution of potassium peroxodisulfate was performed within 180 min. Simultaneously, 1980 g of butyl acrylate, 9.94 g of allyl methacrylate and 2059 g of a 1% potassium myristate solution were added within 180 min. After the addition had ended, the interior reactor temperature was maintained for 60 min and the preparation was cooled down subsequently. 6963 g of the dispersion were discharged, having a solid content of 29.6 wt %, the surface tension was 56.4 mN/m and the pH was 8.1. The average volume-based particle size was 74 nm.

Graft Copolymer

The preparation was prepared following Example 1. The solid content of the dispersion was 32.4 wt %, the surface tension was 48.8 mN/m, the pH was 8.0. The average volume-based particle size was 131 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 50.0 wt % by an oxygen analysis.

The samples according to the invention can be processed to transparent press plates. The samples according to the invention are characterized in that both the graft base and the graft shell are non-cross-linked, or that the graft base is non-cross-linked while the graft shell is cross-linked, or that the average particle size is below 150 nm when both the graft base and the graft shell are cross-linked, or when only the graft base is cross-linked while the graft shell is non-cross-linked.

The Comparative Examples mentioned below give proof that such press plates are opaque that were made from graft copolymers having a particle size of greater than 150 nm, which have both a cross-linked graft base and a cross-linked graft shell or which have a cross-linked graft base and a non-cross-linked graft shell.

Comparative Example 1

Graft Base

Into a 10-liter reactor with stirrer, 1887 g of deionized water, 68.25 g of butyl acrylate, 0.35 g of allyl methacrylate, 308.8 g of potassium myristate (concentration: 1 wt %), and 0.63 g of potassium peroxodisulfate were pre-charged and heated to 80° C. After the reaction had started, adding of 686 g of a 0.3% aqueous solution of potassium peroxodisulfate was performed within 180 min. Simultaneously, 1980 g of butyl acrylate, 9.94 g of allyl methacrylate and 2059 g of a 1% potassium myristate solution were added within 180 min. After the addition had ended, the interior reactor temperature was maintained for 60 min and the preparation was cooled down subsequently. 6925 g of the dispersion were discharged, having a solid content of 29.6 wt %, a surface tension of 52.6 mN/m and a pH of 8.2. The average volume-based particle size was 135 nm.

Graft Copolymer

The preparation was prepared following Example 1. The solid content of the dispersion was 28.3 wt %, the surface tension was 42.5 mN/m, the pH was 8.4. The average volume-based particle size was 176 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 49.6 wt % by an oxygen analysis.

Comparative Example 2

Graft Base

Into a 10-liter reactor with stirrer, 1990 g of deionized water, 68.25 g of butyl acrylate, 0.35 g of allyl methacrylate, 205.9 g of potassium myristate (concentration: 1 wt %), and 0.63 g of potassium peroxodisulfate were pre-charged and heated to 80° C. After the reaction had started, adding of 686 g of a 0.3% aqueous solution of potassium peroxodisulfate was performed within 180 min. Simultaneously, 1980 g of butyl acrylate, 9.94 g of allyl methacrylate and 2059 g of a 1% potassium myristate solution were added within 180 min. After the addition had ended, the interior reactor temperature was maintained for 60 min and the preparation was cooled down subsequently. The average volume-based particle size was 180 nm.

Graft Copolymer

The preparation was prepared following Example 1. The solid content of the dispersion was 26.3 wt %, the surface tension was 40.8 mN/m, the was pH 8.8. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 52 wt % by an oxygen analysis. The average volume-based particle size was 224 nm.

Comparative Example 3

Graft Base

Into a 10-liter reactor with stirrer, 2134 g of deionized water, 68.29 g of butyl acrylate, 0.34 g of allyl methacrylate, 61.76 g of potassium myristate (concentration: 1 wt %) and 0.63 g of potassium peroxodisulfate were pre-charged and heated to 80° C. After the reaction had started, adding of 686.3 g of a 0.3% aqueous solution of potassium peroxodisulfate was performed within 180 min. Simultaneously, 1980 g of butyl acrylate, 9.94 g of allyl methacrylate and 2059 g of a 1% potassium myristate solution were added within 180 min. After the addition had ended the interior reactor temperature was maintained for 60 min the preparation was cooled down subsequently. 6998 g of an aqueous dispersion, having a solid content of 29.6 wt %, a surface tension of 47.9 mN/m and a pH of 8.3, were obtained. The average volume-based particle size was 272 nm.

Graft Copolymer

Into a 10-liter autoclave with a water-cooled double jacket and a paddle agitator, 1515 g of water, 387 g of a 5% solution of potassium myristate, 3705 g of graft base, 9.33 g of diallyl phthalate and 1227 g of vinyl chloride were pre-charged and heated to 68° C. When the polymerization temperature was reached, adding of potassium peroxodisulfate and ascorbic acid was started. The adding speed was adjusted in such a way that the difference between the interior temperature and the supply temperature of the jacket cooling was about 10° C. After the pressure had dropped by 4 bars, the preparation was set to cool and depressurized. The dispersion was discharged. The solid content of the dispersion was 27.1 wt %, the surface tension was 38.8 mN/m, the pH was 8.2. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 56.6 wt % by an oxygen analysis. The average volume-based particle size was 336 nm.

Comparative Example 4

Graft Base

The same graft base as in Example 3 was used.

Graft Copolymer 1299 g of water, 332 g of a 5% potassium myristate solution, 3176 of graft base and 1060 g of vinyl chloride were pre-charged and then polymerized based on Comparative Example 3. The dispersion was discharged. The solid content of the dispersion was 27.1 wt %, the surface tension was 37.4 mN/m, the pH was 8.7. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 57.2 wt % by an oxygen analysis. The average volume-based particle size was 327 nm.

On a two-roll roller the powdered graft copolymers were processed and pressed into rolled sheets. In the following Table 1 the poly(butyl acrylate) content, the degree of cross-linking, the particle sizes of the graft copolymers and the optical properties (transmittance, haze) are given.

Experimental Procedures

Measurement of Particle Sizes

The particle size distributions were measured with a Microtrac Blue-Wave of the S3500 series by Particle-Metrix. The valid measuring range lies between 0.01 and 2000 µm. For the measurement, a standard procedure for dispersions was created, where certain physical properties of the dispersion were given. Before measurement, three drops of Hellmanex® (by Hellmanex-Analytics Inc.) were added to the deionized water inside the circulation unit, using a disposable 3 ml pipette. The cleanliness of the measurement system was validated by a baseline measurement. Dispersion was added carefully to the sample unit until a loading factor of about 0.004 was reached. Normally, 1 or 2 drops of dispersion are sufficient. The measurement time was 30 s. Evaluation of the measurement is carried out automatically. The average volume-based particle size is used.

Two-Roll Rolling Mill (Including Processing Conditions and Recipe)

To determine mechanical values and optical properties, test samples have to be provided. The preparation of the rolled sheets is performed under the following conditions.

| Recipe (spatula blend) |
| --- |
| 100 phr Polymer |
| 1.5 phr BaZn stabilizer (Baerostab UBZ 171) |
| 3.0 phr Epoxydated soy bean oil (Edenol D 81) |
| 0.1 phr Isotridecyl stearate (Loxiol G 40) |
| 0.2 phr High-molecular weight multi-part adhesive (Loxiol G 72) |
| 0.1 phr Calcium stearate (Ceasit SW) |

Rolling mill (made by Schwabenthan)
Roller material: chromed surfaces
Roller diameter: 150 mm
Speed ratio: 17/21 1/min
Roller temperature: 140° C.
Rolling time: 5 min
Execution:
In order to form a cohesive mass (sheet) the powder compound is placed onto the roller. After formation of the sheet, it is "cut" and "turned" for 3 min. Then set the thickness of the rolled sheet to 1.1 mm and continue to plasticize on the roller for further 2 min without cutting and turning. When the specified rolling time is over, the rolled sheet is taken off.
Press
30-ton laboratory press (Werner & Pfleiderer URH 30)
Press area: 350×350 mm
Pressing plates: chromed surfaces
Pressing frame: 220×220×1.0 mm
Execution:
For making the press plates, the previously rolled sheets were cut corresponding to the frame size used, inserted into the frame and placed into the laboratory press together with the press plates that form the outer surfaces. The sheets are formed into a press plate under the conditions described below.

| Press temperature: 150° C. | |
| --- | --- |
| LP press power: 30 bar | LP pressing time: 2 min |
| HP press power: 200 bar | HP pressing time: 3 min |
| Removal temperature: 40° C. | |
| Cooling pressure: 220 bar | Cooling time: 8 min |

Transmittance and Haze (Large-Angle Scattering)

In order to evaluate a film's transparency two values were considered:

the total transmittance (here: "transmittance"), which stands for the ratio of transmitted light to incident light and which depends on absorption properties and surface conditions large-angle scattering (haze), which is a measure for opaqueness.

Measurement:

The measurement of the transmittance and the determination of the large-angle scattering of the semi-finished products produced with rollers/presses is carried out with the transparency meter Haze-Gard Dual by Byk-Gardner Inc.

The sample to be measured is illuminated perpendicularly and the transmitted light is photoelectrically measured in an integrating sphere. The perpendicularly transmitted light is measured in order to evaluate the transmittance, and the light that is scattered in an angle of 2° to the axis of irradiation is measured to evaluate the opaqueness (haze). The measurements are carried out according to ISO 13468. This guarantees that the measurement conditions are the same during calibration as well as during measurement.

TABLE 1

Overview: Test and Comparative Examples and Press Plates Made Therefrom

| Patent Examples | PBA content (wt %) | Microtrac MV (nm) | Shore Hardness A | Shore Hardness D | Thickness of Press Plates (mm) | Transmittance, % | Haze | Remarks |
| --- | --- | --- | --- | --- | --- | --- | --- | --- |
| Example 1 | 46.9 | 61 | 85 | 26 | 1.50 | 84 | 13.2 | Graft base |
| Example 2 | 33 | 58 | 97 | 46 | 1.68 | 80.7 | 6.92 | and graft |
| Example 3 | 19.2 | 56 | 97 | 59 | 1.74 | 74.8 | 9.06 | shell cross- |
| Example 4 | 41.1 | 92 | 90 | 35 | 1.73 | 83.0 | 11.7 | linked and |
| Example 5 | 50 | 131 | 87 | 31 | 1.56 | 78.4 | 13.0 | PSV < 150 nm |
| Comparative Example 1 | 49.6 | 176 | 87 | 32 | 1.57 | 73.0 | 21.9 | Comparative Examples |
| Comparative Example 2 | 52 | 224 | 84 | 24 | 1.83 | 52.6 | 43.5 | PSV ≥ 150 nm |
| Comparative Example 3 | 56.6 | 336 | 88 | 31 | 1.59 | 52.4 | 52.7 | |
| Comparative Example 4 | 57.2 | 327 | 85 | 27 | 1.64 | 48.3 | 63.7 | |
| Blend Example 1 | 29.6 | | 94 | 59 | 1.67 | 75.4 | 16.4 | 0.75 Example 2 + 0.25 Example 3 |
| Blend Example 2 | 40 | | 92 | 38 | 1.49 | 69.9 | 93.2 | 0.75 Example 1 + 0.25 Example 3 |
| Vinnolit VK 710 | ca. 50 | | 85 | 28 | 1.48 | 78.0 | 65.8 | Competitive |
| Vinnolit K 707 E | ca. 50 | | 79 | 25 | 1.81 | 53.9 | 68.8 | product samples |

The graft copolymers Vinnolit VK 710 and Vinnolit K707 E, having an acrylate content of about 50 wt %, represent the prior art. Especially due to the high haze value (which characterizes the large-angle scattering), the press plates appear translucent to opaque. The examples according to the invention have a considerably better transparency, which features a substantially lower scattering. The test and comparative samples prove the effect of particle sizes of the graft copolymers on the transparency of the PVC articles made therefrom.

The Examples 8 to 12 according to the invention have a higher transparency than the Comparative Examples 1 to 3, which are cross-linked in the same manner and which have particle sizes of above 170 nm. When the graft base and the graft shell are cross-linked, the transparency of a press plate made therefrom will be improved substantially by reducing the particle size to below 200 nm.

Blends consisting of the graft copolymers according to the invention that differ from each other in their PBA content (see Blend Example 1) have a higher transparency than Comparative Examples 1 to 4.

In contrast to this, blends of a transparent graft copolymer with S-PVC are opaque. For example, a transparent press plate made from the graft copolymer of Example 1, which is per se transparent, becomes opaque if S-PVC is admixed to the graft copolymer to a proportion of 25 wt %.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A transparent article formed of a vinyl chloride graft copolymer, the article prepared by a process comprising:
    forming the vinyl chloride graft copolymer by:
        preparing a graft base by polymerizing monomers, wherein the graft base has a first glass transition temperature;
        grafting a copolymer phase having a second glass transition temperature onto the graft base by emulsion polymerization, to form a vinyl chloride graft copolymer latex including the vinyl chloride graft copolymer; and
    separating the vinyl chloride graft copolymer as a solid from the vinyl graft copolymer latex,
    wherein the first glass transition temperature is lower than the second glass transition temperature, the average particle size of the vinyl chloride graft copolymer is less than 200 nm, and the article has a transmittance of at least 65% as measured according to ISO 13468 for a plate having a thickness from 1.49 mm to 1.74, a haze value of less than 60 as measured according to ISO 13468 for a plate having a thickness from 1.49 mm to 1.74 and measured at an angle of 2 degrees to an axis of irradiation, or a transmittance of at least 65% as measured according to ISO 13468 for a plate having a thickness from 1.49 mm to 1.74 and a haze value of less than 60 as measured according to ISO 13468 for a plate having a thickness from 1.49 mm to 1.74 and measured at an angle of 2 degrees to an axis of irradiation.

2. The transparent article of claim 1, wherein the second glass transition temperature is from about 20° C. to about 120° C. and the first glass transition temperature is from about −80° C. to about 20° C.

3. The transparent article of claim 1, wherein the copolymer phase is grafted onto the graft base by emulsion polymerization using at least one emulsifier.

4. The transparent article of claim 3, wherein from about 60 wt. % to about 100 wt. % of the at least one emulsifier is pre-charged, based on the total amount of the at least one emulsifier.

5. The transparent article of claim 1, wherein the graft base of monomers is polymerized at a temperature of from about 20° C. to about 90° C.

6. The transparent article of claim 1, wherein the copolymer phase is grafted onto the graft base at a temperature of from about 45° C. to about 90° C.

7. The transparent article of claim 1, wherein the vinyl chloride graft copolymer includes from about 5 wt. % to about 70 wt. % of the graft base and from about 30 wt. % to about 95 wt. % of the copolymer phase.

8. The transparent article of claim 1, wherein the graft base includes a first polymerized vinyl compound and a second polymerized vinyl compound.

9. The transparent article of claim 1, wherein the copolymer phase comprises from about 60 wt. % to about 100 wt. % vinyl chloride and from about 0 wt. % to about 40 wt. % polymerized vinyl compounds.

10. The transparent article of claim 1, wherein the graft base, the grafted copolymer phase, or a combination thereof are cross-linked.

11. The transparent article of claim 1 prepared by the process further comprising:
    forming a second vinyl chloride graft copolymer by:
        grafting the copolymer onto the graft base by emulsion polymerization to form a second vinyl chloride graft copolymer latex including the second vinyl chloride graft copolymer; and
        separating the second vinyl chloride graft copolymer as a solid from the second vinyl graft copolymer latex; and
        combining the vinyl chloride graft copolymer and the second vinyl chloride graft copolymer, wherein the weight ratio of the graft base to the grafted copolymer base of the vinyl chloride graft copolymer is different than that of the second vinyl chloride graft copolymer.

12. The transparent article of claim 11, wherein the vinyl chloride graft copolymer and the second vinyl chloride graft copolymer are selected from the group consisting of:
    graft copolymer A including from about 41 wt. % to about 70 wt. % of the graft base and from about 30 wt. % to about 59 wt. % of the grafted copolymer phase;
    graft copolymer B including from about 26 wt. % to about 40 wt. % of the graft base and from about 60 wt. % to about 74 wt. % of the grafted copolymer phase; and
    graft copolymer C including from about 5 wt. % to about 25 wt. % of the graft base and from about 75 wt. % to about 95 wt. % of the grafted copolymer phase.

13. The transparent article of claim 12, wherein the vinyl chloride graft copolymer and the second vinyl chloride graft copolymer are selected from the group consisting of:

from about 1.0 wt. % to about 99 wt. % graft copolymer A;

from about 1.0 wt. % to about 99 wt. % graft copolymer B; and from about 1.0 wt. % to about 99 wt. % graft copolymer C;

wherein the graft base has a glass transition temperature from about −80° C. to about 20° C., the grafted copolymer phase has a glass transition temperature from about 20° C. to about 120° C., and the transparent article contains at least 25 wt. % of the vinyl chloride graft copolymer and the second copolymer.

14. The transparent article of claim 1 prepared by the process further comprising:

forming a second vinyl chloride graft copolymer by:
grafting the copolymer onto the graft base by emulsion polymerization to form a second vinyl chloride graft copolymer latex including the second vinyl chloride graft copolymer; and
separating the second vinyl chloride graft copolymer as a solid from the second vinyl graft copolymer latex;

forming a third vinyl chloride graft copolymer by:
grafting the copolymer onto the graft base by emulsion polymerization to form a third vinyl chloride graft copolymer latex including the third vinyl chloride graft copolymer; and
separating the third vinyl chloride graft copolymer as a solid from the third vinyl graft copolymer latex; and combining the vinyl chloride graft copolymer, the second vinyl chloride graft copolymer, and the third vinyl chloride graft copolymer, wherein the weight ratio of the graft base to the grafted copolymer base of the vinyl chloride graft copolymer is different than that of the second vinyl chloride graft copolymer and the weight ratio of the graft base to the grafted copolymer base of the third vinyl chloride graft copolymer is different than the vinyl chloride graft copolymer and the second vinyl chloride graft copolymer.

15. The transparent article of claim 14, wherein the vinyl chloride graft copolymer, the second vinyl chloride graft copolymer, and the third vinyl chloride graft copolymer are selected from the group consisting of:

graft copolymer A including from about 41 wt. % to about 70 wt. % of the graft base and from about 30 wt. % to about 59 wt. % of the grafted copolymer phase;

graft copolymer B including from about 26 wt. % to about 40 wt. % of the graft base and from about 60 wt. % to about 74 wt. % of the grafted copolymer phase; and graft copolymer C including from about 5 wt. % to about 25 wt. % of the graft base and from about 75 wt. % to about 95 wt. % of the grafted copolymer phase.

16. The transparent article of claim 15, wherein the vinyl chloride graft copolymer, the second vinyl chloride graft copolymer, and the third vinyl chloride graft copolymer are selected from the group consisting of:

from about 1.0 wt. % to about 99 wt. % graft copolymer A;

from about 1.0 wt. % to about 99 wt. % graft copolymer B; and from about 1.0 wt. % to about 99 wt. % graft copolymer C;

wherein the grafted copolymer phase has a glass transition temperature from about 20° C. to about 120° C., the graft base has a glass transition temperature from about −80° C. to about 20° C., and the transparent article contains at least 25 wt. % of the vinyl chloride graft copolymer, the second vinyl chloride graft copolymer, and the third vinyl chloride graft copolymer.

* * * * *